United States Patent [19]

Mino

[11] Patent Number: 4,470,067
[45] Date of Patent: Sep. 4, 1984

[54] AUTOMATIC GAIN CONTROL APPARATUS

[75] Inventor: Mitsuo Mino, Tokyo, Japan

[73] Assignee: Japan Broadcasting Corp., Tokyo, Japan

[21] Appl. No.: 330,603

[22] Filed: Dec. 14, 1981

[30] Foreign Application Priority Data

Dec. 27, 1980 [JP] Japan ............................ 55-187568[U]

[51] Int. Cl.³ ............................................. H04N 5/20
[52] U.S. Cl. ..................................... 358/174; 358/169
[58] Field of Search ...................... 358/27, 29, 32, 164, 358/174, 169, 170, 168, 160, 37

[56] References Cited

U.S. PATENT DOCUMENTS 3,560,645  2/1971  Wallace ................................ 358/170

OTHER PUBLICATIONS

Automatic Beam Current Optimizer "IC" for Improvement of Latitude in Hand-Held TV Cameras, by K. Wakui, et al., NHK Laboratories Note, Ser. No. 227, Sep. 1978, pp. 1-10.

Primary Examiner—Tommy P. Chin
Attorney, Agent, or Firm—Parkhurst & Oliff

[57] ABSTRACT

An automatic gain control apparatus wherein red, blue and green channels of an input image signal are supplied directly, and indirectly through variable gain amplifiers, to black-level non-additive mixing circuits, respectively, and the channel signals of the input image signal are further supplied to a white peak non-additive mixing circuit for selecting a maximum level of the input image signals. Each of the gains of the variable gain amplifiers is controlled based on the selected maximum level for varying the knee slope in a manner such that the output image signal obtained from the black-level non-additive mixing circuits takes a white clip level at the peak level of the input image signal. Since any collapse of peak portions in the white level of the input image signal can be prevented regardless of a wide variation in a dynamic range of the input image signal. The apparatus is advantageously used in a television camera of a high latitude adapted for obtaining a shadowgraph of, for instance, a person standing indoors against a background of a bright sky or window.

11 Claims, 13 Drawing Figures

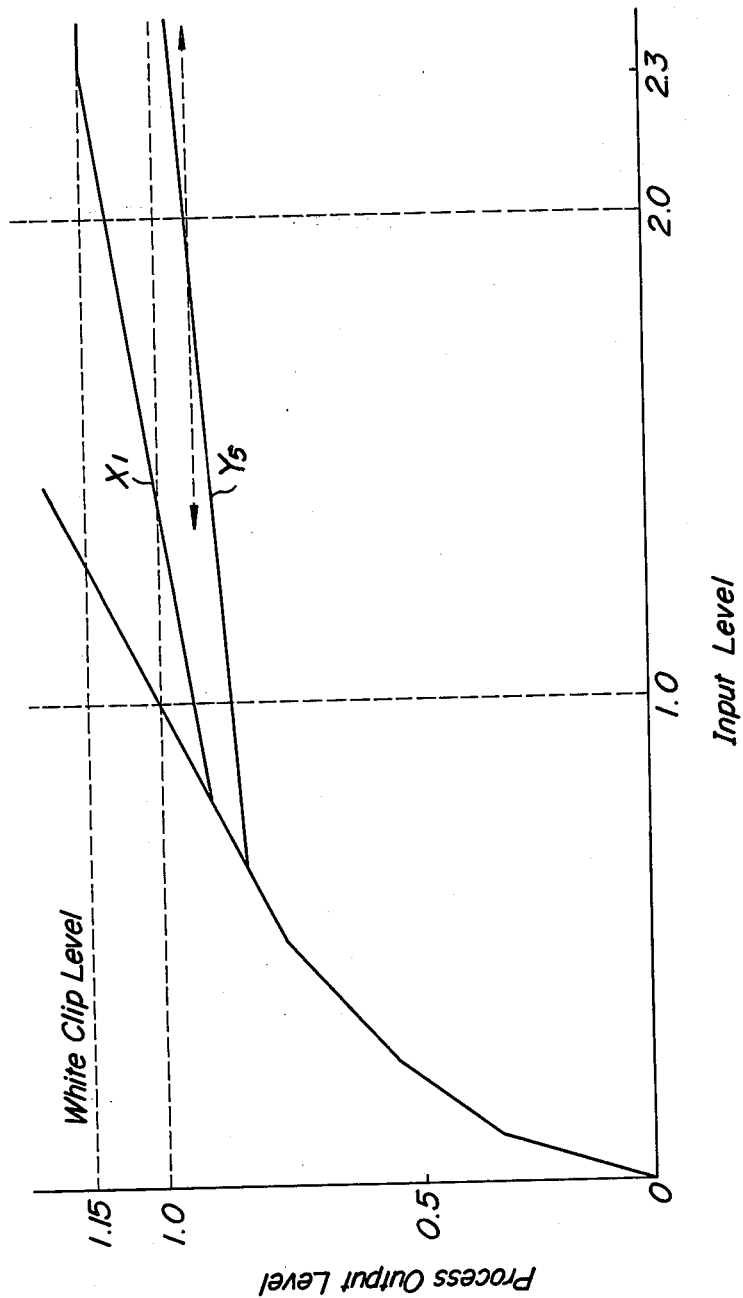

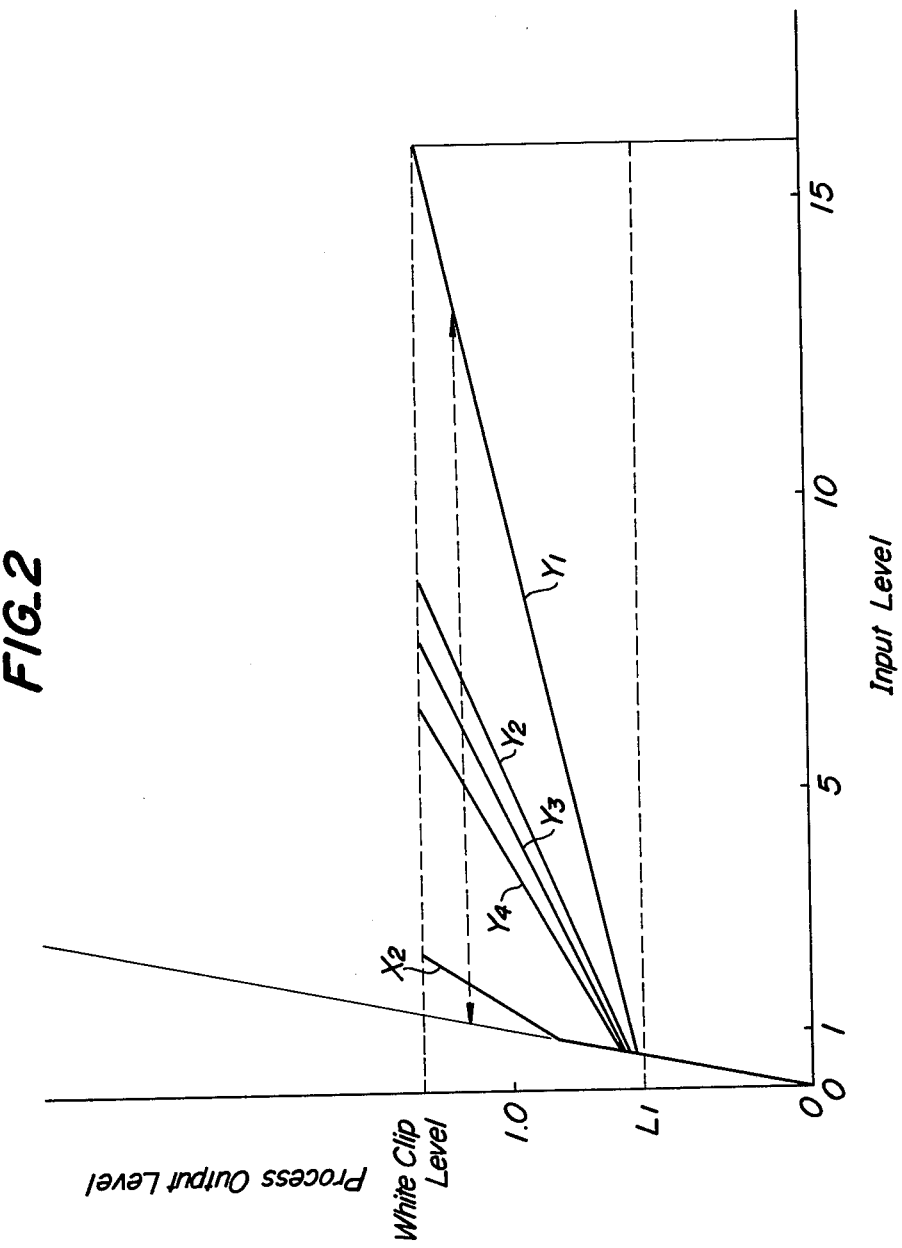

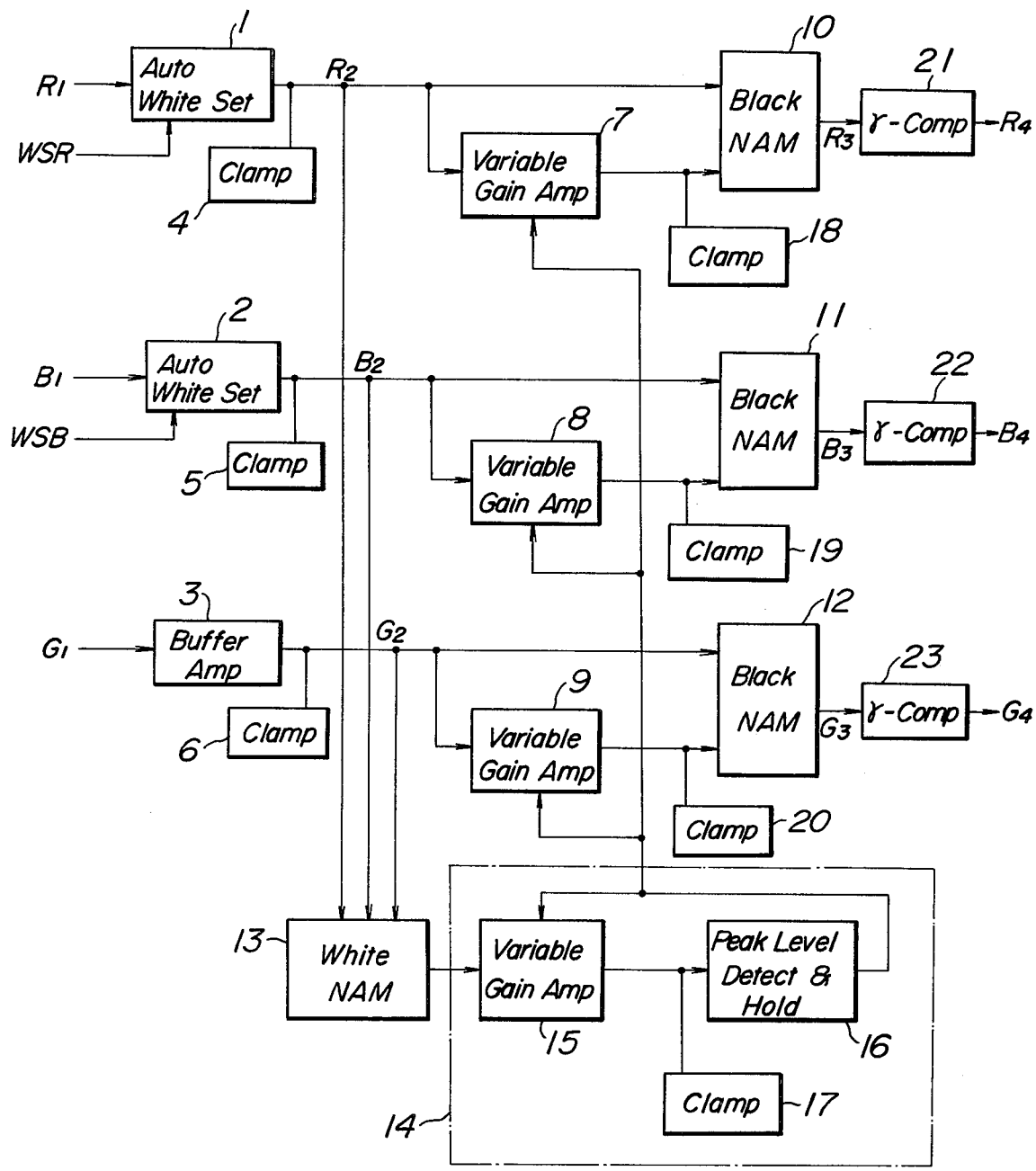

FIG_4A
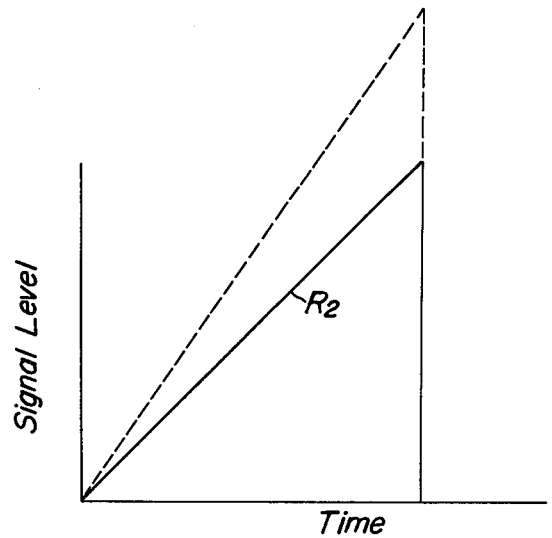
FIG_4B
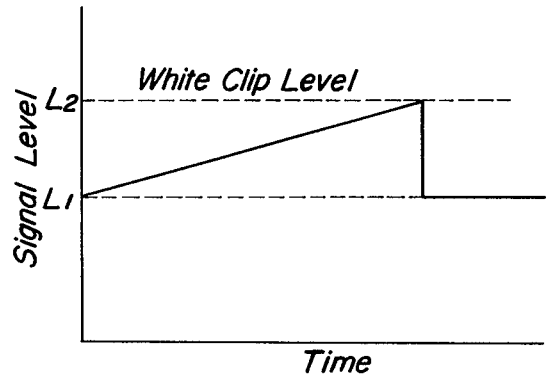
FIG_4C
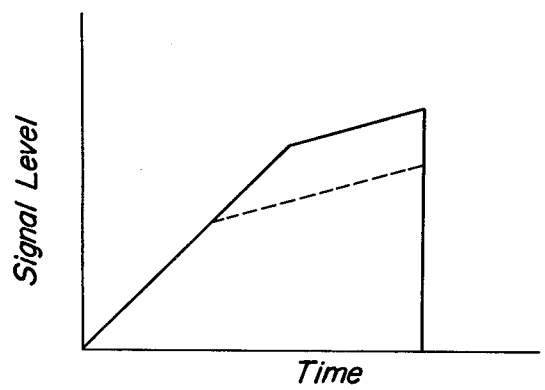

AUTOMATIC GAIN CONTROL APPARATUS

BACKGROUND OF THE INVENTION

The present invention relates to an automatic gain control apparatus which can prevent a peak part in white level of an image from being clipped when the image is transferred into an electric image signal, and any loss of information contained in the white level portion is thereby eliminated.

Heretofore, an image transfer curve having a knee slope fixed at a constant value of $\gamma = 0.45$ has been ordinarily used for a television broadcasting camera. However, when a camera of such a characteristic is used for obtaining picture of an object having a bright portion having a brightness of two to three times a 100% white set as a reference signal, the bright portion tends to reach a white clip level, thus resulting so-called "collapsed image". In other words, the contrast range of such a camera is narrower than the contrast range of an ordinary photographic film, and when a picture with a high contrast ratio, such as a person staying indoors against a background of a bright sky or window, is desired to be obtained, an adjustment of a camera to a value adapted for the contrast of the person tends to result an over exposure for the background, thus producing a picture having a background utterly white.

In a case where a photoconductive type image tube is used, the beam current of the same tube is ordinarily selected at two to three times of a maximum rated input level of the image tube in consideration of the resolution and the operational life of the same tube. Such a condition, however, is liable to cause disadvantageous effects termed "comet tail" and "blooming phenomenon".

To prevent such a disadvantage, an automatic beam optimizer (as disclosed in an article "Automatic beam current optimizer IC for improvement of latitude in hand-held TV camera" by Kotaro Wakui et al, NHK Laboratories Note Ser. No. 227, September 1978) has been used for automatically controlling the beam current in the image tube in accordance with an incident light quantity. By this optimizer, the light image can be transferred to an electric signal in a wide dynamic range without causing insufficient beam current even in a case where the incident light has an intensity as high as 16 times a reference incident light quantity.

However, in a present state of technique, an output electric signal obtained with a wide dynamic range for a high contrast object is processed in a circuit having a fixed knee characteristics as described above. For this reason, regardless of an input signal having a high white portion realized by the automatic beam optimizer, an output image signal having a white portion clipped and therefore collapsed has been obtained from the processing circuit. That is, the advantageous feature of the automatic beam optimizer has not been fully utilized.

SUMMARY OF THE INVENTION

A primary object of the present invention is to provide an automatic gain control apparatus wherein the knee slope is varied suitably according to a peak level of an input image signal so that a peak part of a white level portion of the input signal is not clipped regardless of a wide variation thereof, and the image information contained in the white level portion is not thereby lost.

According to the present invention, there is provided an automatic gain control apparatus comprising means for detecting a signal level of an input image signal, and means for varying a knee slope according to the level of the input image signal thus detected so that the level of the input image signal is compressed in accordance with the thus detected level without being saturated.

In a preferred embodiment of the present invention, an input image signal is applied directly, and indirectly through a variable gain amplifier, to a low-level selecting means, and the input image signal made of different channel signals is also applied to a high-level selecting means which selects a maximum level out of the different channel signals. The gain of the variable gain amplifier is controlled based on the maximum level, and the knee slope thereof is varied in a manner such that the output image signal obtained from the low-level selecting means is in a white clip level when the input image signal is in its peak level.

Furthermore, a level at which the knee slope starts may also be varied in accordance with the signal level of the input image signal, or otherwise the level at which the knee slope starts may be held constant. Preferably, a ratio of a white portion against the entire image area is determined, and the device of the invention is so constructed that the peak level is not detected for a white portion of a small area.

According to the present invention, it is made possible to provide a television camera having a wide latitude and utilizing a wide dynamic range constituting a characteristic feature of the automatic beam optimizer.

BRIEF DESCRIPTION OF THE DRAWINGS

In the accompanying drawings:

FIG. 1 is a graph showing a conventional relation and a novel relation according to the present invention, between a process output level and an input signal level exhibited after a gamma compensation;

FIG. 2 is a graph showing a conventional relation and various relations according to this invention between a process output level and an input signal level exhibited before a gamma compensation;

FIG. 3 is a block diagram showing an embodiment of an automatic gain control apparatus according to the invention;

FIGS. 4A through 4C are diagrams showing waveforms at various parts of the embodiment shown in FIG. 3.

DETAILED DESCRIPTION OF PREFERRED EMBODIMENTS

Figure 5:
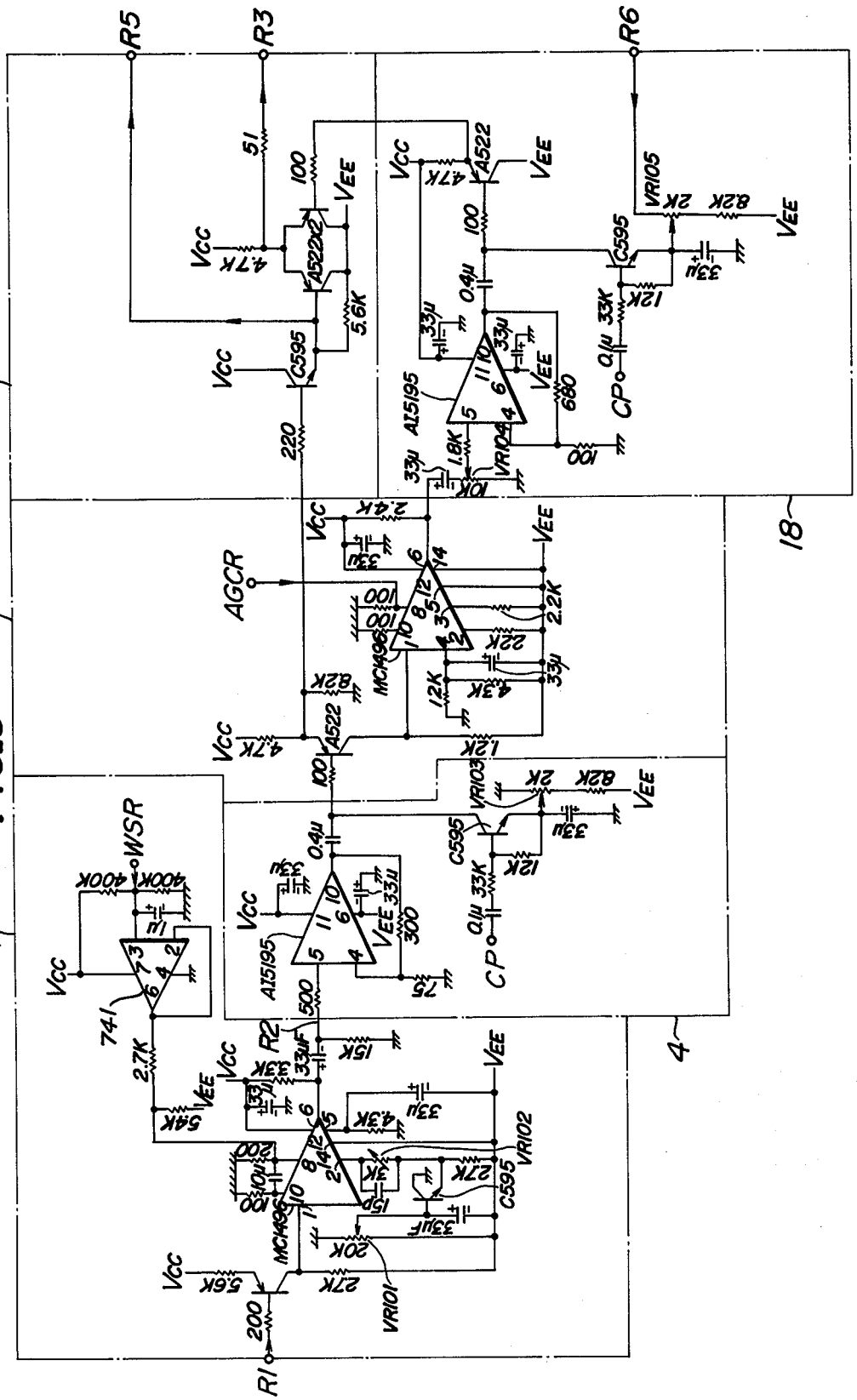
FIGS. 5 through 11 are circuit diagrams showing various components of FIG. 3 in more details.

Ordinarily, when a white level portion of an image signal obtained from a television camera becomes excessive, a peak part of the white level portion is clipped in a white clip circuit. The white clip circuit usually includes a knee circuit of a fixed characteristic, which varies the peak part of the white level signal in a folded manner, as shown by a curve $X_1$ in FIG. 1, according to the input level of the image signal so that the peak part is thereby clipped. The curve $X_1$ indicates an image input level versus process output level characteristics attained by a conventional fixed knee-slope circuit after subjected to a gamma compensation. As is apparent from FIG. 1, the image output level is clipped only when it goes up in excess of a white clip level which is attained when the input level exceeds 230% of a maximum rated input level, and for an input level higher than this critical value, the image output level is saturated into a white level so that no image can be thereby reproduced.

In FIG. 2, there are indicated image input level versus process output level characteristics $Y_1$, $Y_2$, $Y_3$ and $Y_4$ all of which are obtained before the gamma compensation. As shown in FIG. 2, the knee slope of the characteristic is varied in accordance with the peak level of the image signal in a manner such that the peak part thereof is brought into a position substantially equal to the white clip level. A curve $X_2$ in FIG. 2 represents a conventional input-output characteristic before the gamma compensation, which corresponds to the curve $X_1$ in FIG. 1. By the way, a curve $Y_5$ in FIG. 1 represents a characteristic of this invention after the gamma compensation.

In FIG. 3, there is illustrated an example of an automatic gain control apparatus, which constitutes a preferred embodiment of the present invention.

A red input signal $R_1$, a blue input signal $B_1$ and a green input signal $G_1$, which are obtained by passing the corresponding outputs from an image tube through respective preamplifiers, are applied to auto white-set circuits 1 and 2 and a buffer amplifier 3 respectively for obtaining a white balance. The auto white-set circuits 1 and 2 may be constructed in the form of variable gain amplifiers which upon reception of auto white control signals WSR and WSB widely known as red and blue white-set inputs, vary their gains for realizing the white balance. The outputs delivered from the auto white-set circuits 1 and 2 and in buffer amplifier 3 are clamped by clamp circuits 4, 5 and 6, and the thus clamped outputs $R_2$, $B_2$ and $G_2$ are applied directly, and indirectly through variable gain amplifiers 7, 8 and 9 to black-level non-additive mixing circuits (hereinafter abbreviated to black NAM) 10, 11, and 12, each may be in the form of a low-level comparator. The outputs $R_2$, $B_2$ and $G_2$ are also applied to a white peak non-additive mixing circuit (hereinafter abbreviated to white NAM) 13 which may be in the form of a high-level comparator. The white NAM 13 detects a maximum peak level of the input signals $R_2$, $B_2$ and $G_2$. The thus detected peak level is supplied to an AGC loop circuit 14 comprising a variable gain amplifier 15, a peak level detecting and holding circuit 16 having a predetermined time constant, and a clamp circuit 17, so that the peak level is held at a constant value. That is, the peak level detecting and holding circuit 16 detects the peak level delivered from the variable gain amplifier 15 and clamped in the clamp circuit 17, and holds the peak level at the detected level. The peak level thus held by the circuit 16 is supplied to the variable gain amplifier 15 and also to the gain control input terminals of the variable gain amplifiers 7, 8 and 9, for controlling these amplifiers 7, 8, 9 and 15 at the same gain. Clamp circuits 18, 19 and 20 clamp the output signals of red, blue and green from the variable gain amplifiers 7, 8 and 9 to the starting levels of the knee slopes, respectively. The black NAMs 10, 11 and 12 compare the clamped levels with those of the output signals $R_2$ and $B_2$ that are white set in the white set circuits 1 and 2, and also with the output signal $G_2$ delivered from the buffer amplifier 3, respectively, and deliver either ones of the levels lower than the others, designated by $R_3$, $B_3$ and $G_3$, to $\gamma$ compensating circuits 21, 22 and 23. The $\gamma$ compensating circuits carry out $\gamma$ compensations on the signals $R_3$, $B_3$ and $G_3$, and deliver output signals $R_4$, $B_4$ and $G_4$, respectively.

The operation of the automatic gain control apparatus shown in FIG. 3 will now be described in detail with respect to a case where the red input signal $R_2$ is a saw-tooth wave having a greater amplitude than those of the blue and green input signals $B_2$ and $G_2$.

The red input signal $R_2$ has a waveform as shown in FIG. 4A. By varying the gain of the variable gain amplifier 7 by the application of the output of the peak level detecting and holding circuit 16, an output signal varying between a predetermined output level $L_1$ and a white clip level $L_2$ as shown in FIG. 4B regardless of the size of the input red signal $R_2$, is delivered from the amplifier 7 in response to the application of the input red signal. The black NAM circuit 10 compares the red input signal $R_2$ with the output signal as shown in FIG. 4B obtained from the variable gain amplifier 7, and selects lower level portions of the two signals so as to exhibit a waveform shown in FIG. 4C. Thus when the input signal level is varied in a wide range, the slope of the output signal of the variable gain amplifier 7 is also varied widely for varying the compressing or shrinking ratio of the output signal in its high level range.

Although the operation of the circuit shown in FIG. 3 has been described with respect to a red input signal, it is apparent that the advantageous characteristics having the aforementioned knee slope may also be obtained for the blue and green input signals. Furthermore, by applying the output signals $R_3$, $B_3$ and $G_3$ from the black NAM circuits 10, 11 and 12 to the $\gamma$ compensating circuits 21, 22 and 23, red, blue and green output signals $R_4$, $B_4$ and $G_4$ having smoothed variable knee slope characteristics are delivered from the $\gamma$ compensating circuits 21, 22 and 23.

According to the present invention, the starting point and the inclination of the knee slope are both made variable according to the input signal level. More specifically, the amplitude of the output of the black NAM circuit is not compressed or shrunk when the incident light quantity to the image tube (not shown) is less than 100% of the rated value, and the process circuit shown in FIG. 3 merely performs a $\gamma$ compensating operation. However, when the incident light quantity goes up to 1,600% of the rated value, the starting point of the knee slope is lowered and the inclination of the same is reduced so that the peak value of the output signal is made equal to the white clip level. The predetermined output level $L_1$ shown in FIG. 4B used as an original point of the knee operation is preferably adjusted at a level slightly higher than the level required for obtaining a standard skin color.

FIGS. 5 through 11 illustrate practical circuitries of the aforementioned embodiment. In these drawings, parts corresponding to various blocks in FIG. 3 are surrounded by separate dot-dash lines and designated by like reference numerals. Furthermore, resistance values, capacitance values, model or type numbers of transistors, diodes, and IC are also indicated in these drawings. In the drawings, Vcc designates a stabilized power source voltage of +9 V, $V_{EE}$ designates a stabilized voltage of −9 V. In FIGS. 5 through 8, CP designates a clamp pulse input which is obtained through a buffer amplifier 24 shown in FIG. 10 from a clamp pulse CPC generated in the television camera.

Figure 6:
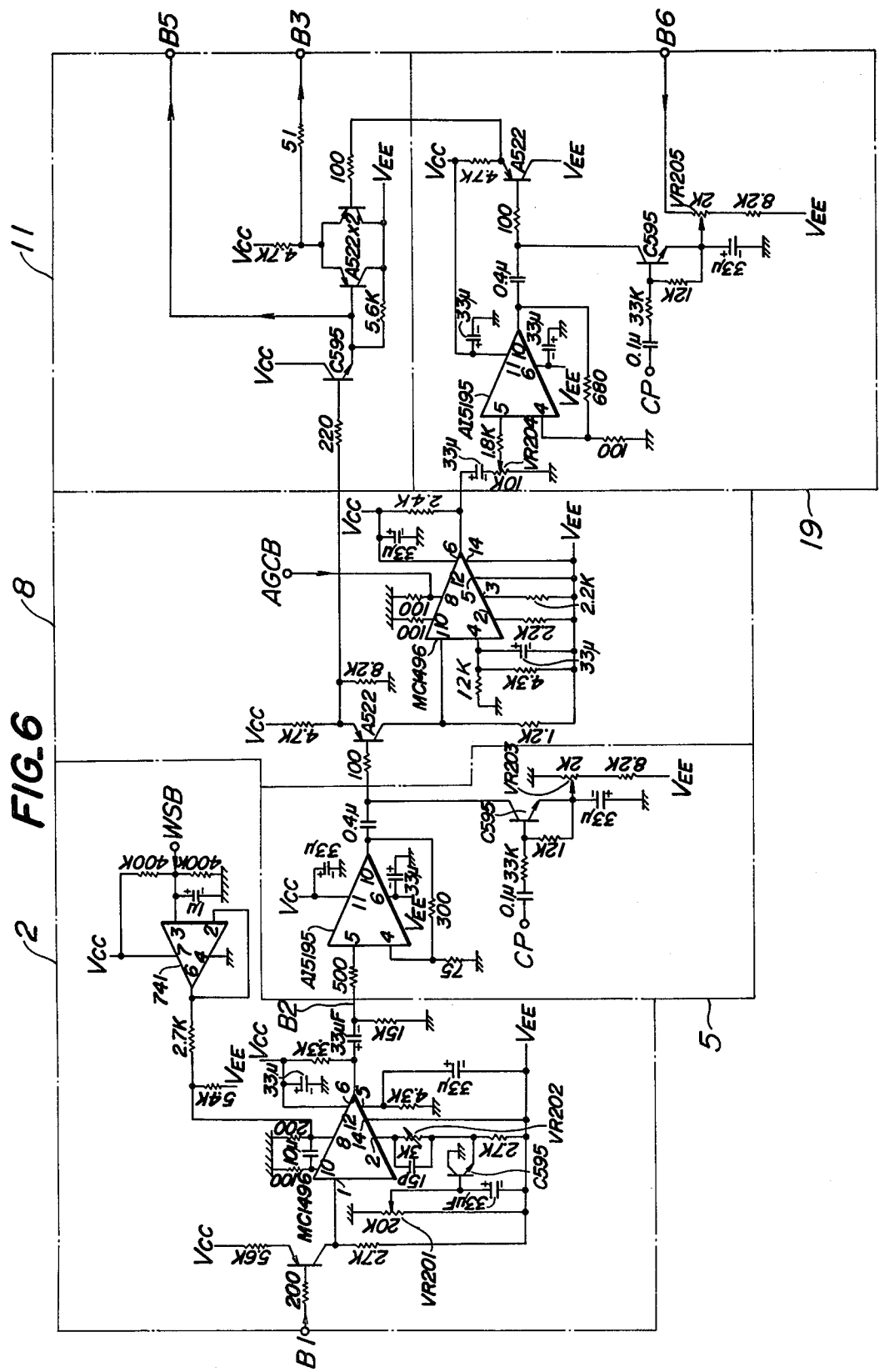
Figure 7:
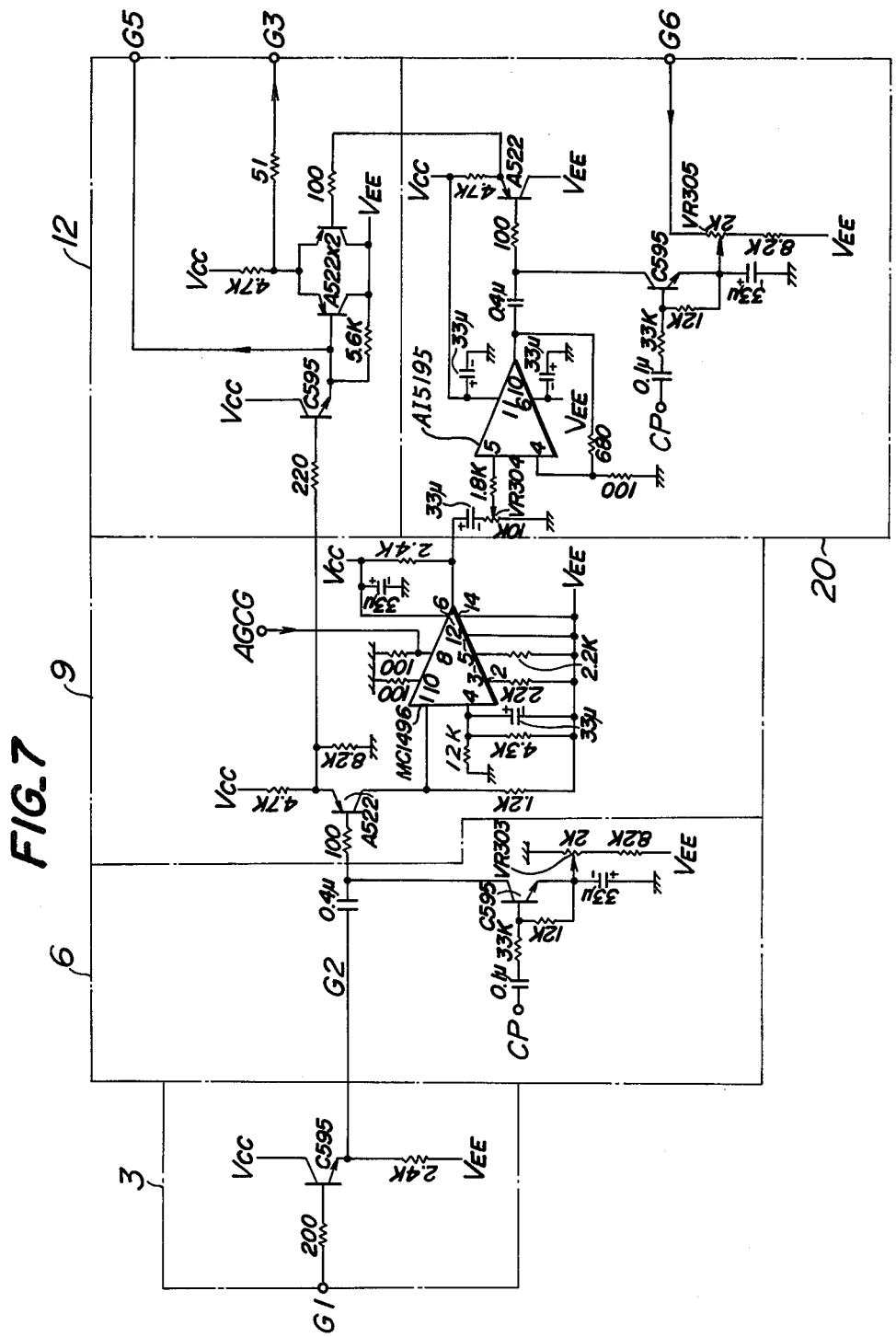

In FIGS. 5 and 6, variable resistors VR101 and VR201 are connected to adjust the bias of a transistor C595 for setting an initiating point of an AGC operation. Variable resistors VR 102 and VR 202 are connected to adjust the gain of a balancing demodulator IC of MC1496 for determining a central point of an auto-white operation. The aforementioned white set input WSR or WSB is applied through a buffer amplifier 741 to an IC MC1496 for carrying out an AGC operation in the red or blue channel. The output of the IC is applied through a clamp circuit 4 or 5 made of a low impedance, wide band, variable gain amplifier AI5195, to a variable gain amplifier 7 or 8 made of an IC MC1496. On the other hand, the input signal $G_1$ for the green channel is supplied to a buffer amplifier 3 as shown in FIG. 7, and the output signal $G_2$ is supplied through a clamp circuit 6 to a variable gain amplifier 9. Variable resistors VR103, VR203 and VR303 in the clamp circuits 4, 5 and 6 are provided for adjusting the black levels of respective signals. AGC signals AGCR, AGCB and AGCG delivered from a peak level detecting and holding circuit 16 shown in FIG. 9 are applied to the variable gain amplifiers 7, 8 and 9, respectively. The outputs of the amplifiers 7, 8 and 9 thus gain-controlled are supplied through variable resistors VR104, VR204 and VR304 to amplifiers AI5195 in clamp circuits 18, 19 and 20, respectively. The gain controlled outputs of transistors A522 in the clamp circuits 18, 19 and 20 are in turn supplied to the black NAM circuits 10, 11 and 12, respectively. The black NAM circuits 10, 11 and 12 compare the output signals obtained from the variable gain amplifiers 7, 8 and 9 with the thus gain-controlled output signals from the clamp circuits 18, 19 and 20, respectively and deliver lower level outputs between the two groups of the outputs from the commonly connected emitters of NOR connected transistors A522 in the black NAM circuits 10, 11 and 12, respectively, as their output signals $R_3$, $B_3$, and $G_3$. Furthermore, output signals $R_5$, $B_5$ and $G_5$ obtained from the emitters of transistors C595 as not-gain-controlled signals are supplied to the white NAM 13 shown in FIG. 8.

Figure 11:
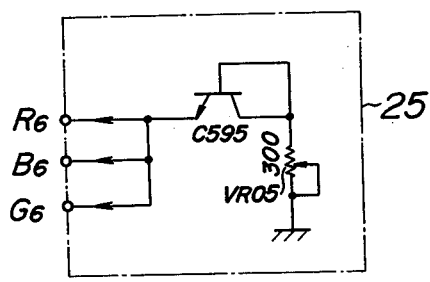

A block in FIG. 11 designated by numeral 25 represents a total knee level regulating circuit. A variable resistor VR05 in the circuit 25 determines the predetermined level $L_1$ shown in FIG. 4B, and delivers outputs $R_6$, $B_6$ and $G_6$ to variable resistors VR105, VR205 and VR305 via diode-connected transistor C595 for temperature stabilization. The variable resistors set clamp levels of the respective channels which are applied to the respective clamping transistors C595.

Figure 8:
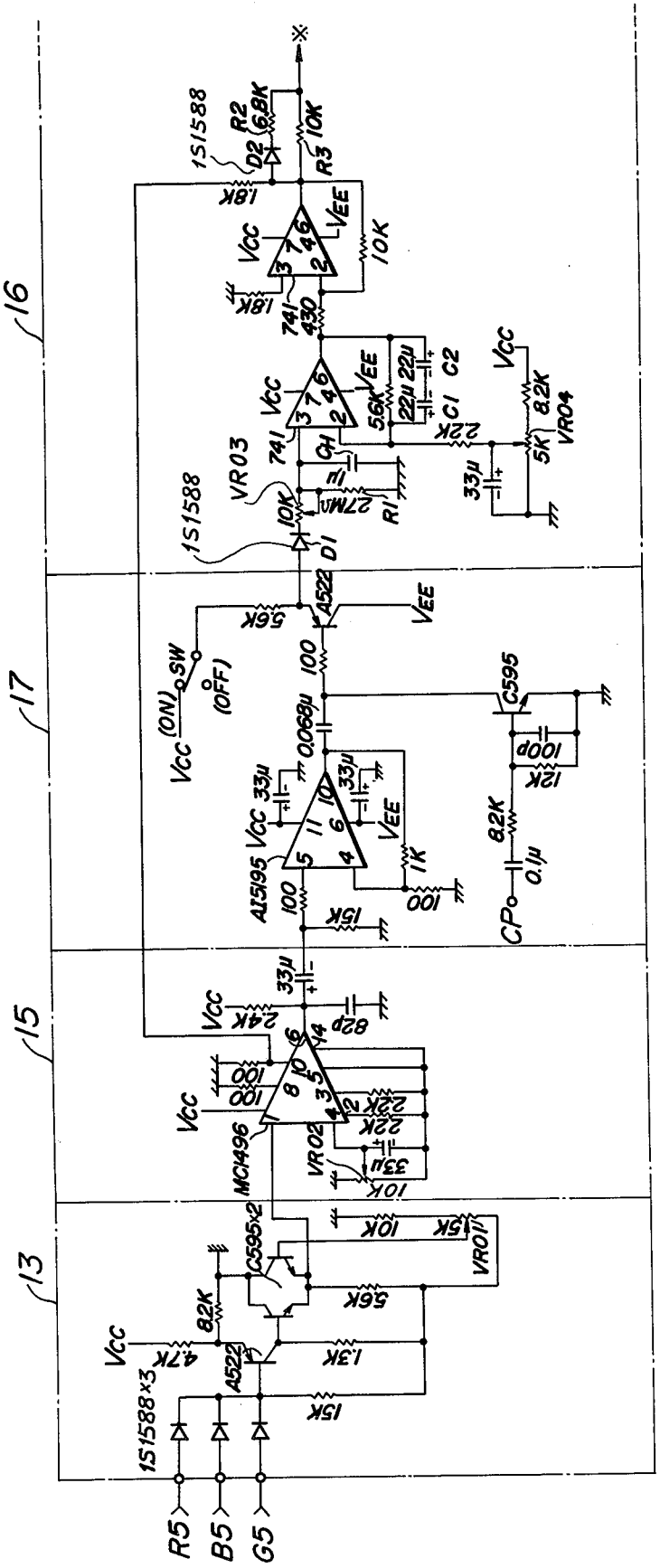
Figure 9:
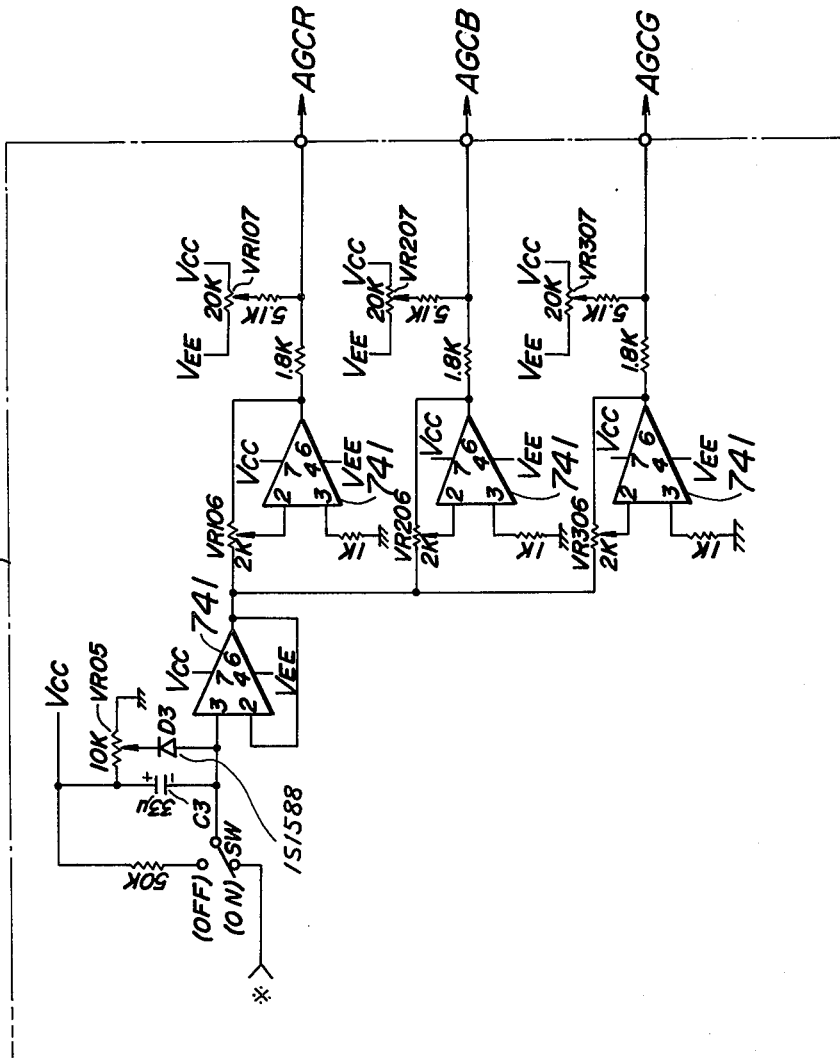
Figure 10:
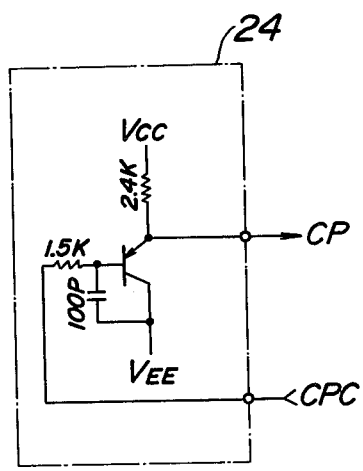

In FIG. 8, the white NAM 13 includes an AND circuit made of diodes (1S1588), which delivers a maximum value out of the signals $R_5$, $B_5$ and $G_5$ applied thereto. The maximum value constituting the output of the white NAM 13 is supplied through a transistor A522 to a clipper made of transistors C595 for preventing the knee slope of the image transfer curve from becoming too low. A voltage obtained from a variable resistor VR01 peak-clip the emitter output of the transistors C595 for restricting the compression ratio. The output of the clipper is supplied to the variable gain amplifier 15 made of MC1496. A variable resistor VR02 in the amplifier 15 adjusts the bias voltage of the MC1496. The MC1496 receives an output from the peak level detecting and holding circuit 16 for controlling the gain of the amplifier 15. The output of the amplifier 15 is supplied through an amplifier AI5195 in the clamp circuit 17 to a clamping transistor C595. A switch SW provided in the clamp circuit 17 transfers the operation between an auto knee operation and a non-auto knee operation where the gain control signals AGCR, AGCB and AGCG indicated in FIG. 9 are all held at constant values. The output of the clamp circuit 17 is supplied to the peak level detecting and holding circuit 16. A diode D1 (1S1588) in the circuit 16 carries out a peak demodulation on the output of the clamp circuit 17. The output signal thus demodulated is sent through a variable resistor VR03 and a hold capacitor $C_H$ to an amplifier 741. By varying the variable resistor VR03, the time constant of a circuit comprising the variable resistor VR03, a resistor R1 and the holding capacitor $C_H$ can be varied in a manner such that the amplifier 741 detects no peak level for a white peak which occupies a small area on an image frame and hence the duration thereof is extremely short. In other words, the variable resistor VR03 determines a ratio of a white peak against the entire area of the frame, which permits the detection of the white peak. The variable resistor is used for regulating the total knee again, and a voltage determined by the resistor regulates a difference between $L_1$ and $L_2$ in FIG. 4B into a constant value. C1 and C2 provided for the amplifier 741 designate smoothing capacitors. The output signal of the amplifier 741 having a waveform peak demodulated and the maximum amplitude thereof being made constant is then applied through another amplifier 741 to a speed-up circuit comprising a diode D2 (1S1588) and resistors R2 and R3. While the time-constant of the variable resistor VR03, resistor R1 and the capacitor $C_H$ effectuates an increase in a falling-down speed of the knee slope, the speed-up circuit impoves the rising-up speed of the knee slope.

The output from the speed-up circuit is applied to still another amplifier 741 shown in FIG. 9 through a level setting device comprising an auto knee switch SW, a capacitor C3, a diode D3 (1S1588) and a variable resistor VR05. When the auto knee switch SW is turned to ON position, an auto knee operation according to this invention is carried out. However, when the auto knee switch SW is turned to OFF position, gain control voltages AGCR, AGCB and AGCG capable of realizing maximum gain operations of the variable gain amplifiers 7, 8 and 9 are applied to these amplifiers. The level setting device comprising the variable resistor VR05 and the diode D3 enables to set the gains of the three color channels at maximum values within the operable ranges, and by so set the time required for the AGC operation can be economized. The capacitor C3 operates as a smoothing capacitor. Variable resistors VR106, 206 and 306 provided for amplifiers 741 on the subsequent stage eliminate any unbalance between the gains of these amplifiers, and determine the magnitude of the gain control signals for the three channels. Variable resistors VR107, VR207 and VR307 are provided for obtaining appropriate centering of the gain control signals in these channels.

Thus, by processing the image input signal by an automatic gain control apparatus according to the present invention, any detail of a white peak portion obtained by the automatic beam optimizer, which is from 10 to 20 times higher than the conventionally obtainable level, can be reproduced as accurately as in the case of a photographic film, and various advantageous features such as eliminating the collapse of the image in the white peak poriton, widening the latitude of a camera for handling various objects and else can be realized. Furthermore, for a camera utilizing an automatic iris control, the device according to the invention can eliminate a skip in the white portion during the iris operation, thus enabling to reproduce the information in the white portion and eliminating any abnormal sensation caused thereby. In addition, the automatic gain control device according to the present invention permits the reproduction of various images such as (1) a person standing indoors with a background of a bright window or else, (2) an outside scenery observed from indoors through a window, (3) a person in a vehicle together with outside scenery, (4) a shadowgraph, and (5) a scene having an illumination entering the field of a camera, all of which have been considered to be difficult conditions in photography.

Although, in an example shown in FIGS. 5 through 11, separate trackings have been obtained by the variable resistors VR104, VR204 and VR304, it may otherwise possible to superpose a blanking pulse on the gain control signals AGCR, AGCB and AGCG, and to supply the resultant signals to the variable gain amplifiers 7, 8 and 9 for controlling the gains of the amplifiers 7, 8 and 9 in a manner rendering a constant peak level during the blanking period based on the blanking pulse.

What is claimed is:

1. An automatic gain control apparatus comprising:
   means for providing an input image signal from each of a plurality of separate color channels;
   a plurality of variable gain amplifiers, each coupled to receive an input image signal from one of said color channels and provide an output;
   a plurality of low-level selecting means coupled to receive an input image signal from one of said color channels and the output of the variable gain amplifier receiving an input image signal from the same color channel and for providing an output image signal which is the lower level one of the received input image signal and the corresponding variable gain amplifier output signal for that color channel;
   high-level selecting means coupled to receive said plurality of input image signals and responsive to the said input image signals for providing an input image signal output having a level equal to the maximum one of said input image signals; and
   gain control means responsive to said input image signal output from said high-level selecting means for controlling the gains of said variable gain amplifiers to vary a knee slope of the amplitude transfer characteristic of each of said low-level selecting means in said separate color channels when the peak level of at least one of said input image signals exceeds a white clip level, in such a manner that the knee slope prevents the output image signals from exceeding the white clip level.

2. An automatic gain control apparatus as set forth in claim 1, wherein said knee slope has a starting level variable in accordance with a level of said input image signal.

3. An automatic gain control apparatus as set forth in claim 1, wherein said knee slope has a starting level fixed to a predetermined value.

4. An automatic gain control apparatus as set forth in claim 1, wherein said gain control means comprises:
   a common variable gain amplifier connected to receive said image signal delivered from said high-level selecting means;
   a peak-demodulating means for peak-demodulating an output delivered from said common variable gain amplifier;
   a holding means for holding a peak demodulated output from said peak demodulating means; and
   means for controlling the gains of said common variable gain amplifier and of said variable gain amplifiers receiving said color channel signals of the input image signal, in accordance with the peak demodulated output held by said holding means.

5. An automatic gain control apparatus as set forth in claim 4, wherein said color channels are of red, blue and green, said input image signals of red and blue channels are supplied to auto-white set circuits, respectively, while said input image signal of green channel is supplied to a buffer amplifier, thereby obtaining white balance between the color channels, and image signals thus being white balanced are supplied to said variable gain amplifiers for those color channels and to said low-level selecting means.

6. An automatic gain control apparatus as set forth in claim 5, wherein the outputs of said auto-white set circuit and said buffer amplifier are clamped at predetermined levels.

7. An automatic gain control apparatus as set forth in claim 4, wherein said peak-demodulated output is supplied through a time-constant circuit to said holding means, and a time constant of said time-constant circuit is so determined that said peak-demodulated output is not supplied to said holding means when the duration time of a white peak in said input image signal is less than said time constant.

8. An automatic gain control apparatus as set forth in claim 1, wherein said gain control means detects an area ratio of a white peak in an image frame based on said input image signal of separate color channels, and prohibits the detection of said peak level, when the area ratio is lower than a predetermined value, for preventing the variation of the knee slope.

9. An automatic gain control apparatus as set force in claim 1, wherein output signals from said variable gain amplifiers provided for said color channels are clamped at predetermined levels, and the thus clamped signals are supplied to said low-level selecting means.

10. An automatic gain control circuit for improving the contrast range of a television camera comprising:
    means for providing color input image signals from separate color channels of a television camera;
    a plurality of variable gain amplifiers, each coupled to receive a color input image signal from one of said color channels and provide an output;
    a plurality of low-level selecting means coupled to receive a color input image signal from one of said color channels and the output of the variable gain amplifier receiving a color input image signal from the same color channel and for providing a color output image signal which is the lower level one of the received color input image signal and the corresponding variable gain amplifier output signal for that color channel;
    high-level selecting means coupled to receive said plurality of color input image signals and responsive to said input image signals for providing an input image signal output having a level equal to the maximum one of said color input image signals; and
    gain control means responsive to said input image signal output from said high-level selecting means for controlling the gains of said variable gain amplifiers to vary a knee slope of the amplitude transfer characteristic of each of said low-level selecting means in said separate color channels when the peak level of at least one of said color input image signals exceeds a white clip level, in such a manner that the knee slope prevents the output image signals from exceeding the white clip level.

11. An automatic gain control circuit for improving the contrast range response to a television camera comprising:
- means for receiving separate color input image signals from a television camera;
- a plurality of variable gain amplifiers, each coupled to receive a color input image signal from one of said color channels and provide an output;
- a plurality of low-level selecting means coupled to receive a color input image signal from one of said color channels and the output of the variable gain amplifier receiving a color input image signal from the same color channel and for providing a color output image signal which is the lower level one of the received color input image signal and the corresponding variable gain amplifier output signal for that color channel; and
- gain control means responsive to one of said plurality of color input image signals for controlling the gains of said variable gain amplifiers to vary a knee slope of the amplitude transfer characteristic of each of said low-level selecting means in said separate color channels when the peak level of at least one of said color input image signals exceeds a white clip level, in such a manner that the knee slope prevents the output image signals from exceeding the white clip level.

* * * * *